No. 748,043. PATENTED DEC. 29, 1903.
H. A. BERGOM.
PIN LOCKING MECHANISM FOR CLEVISES OR SIMILAR PURPOSES.
APPLICATION FILED APR. 22, 1903.
NO MODEL.
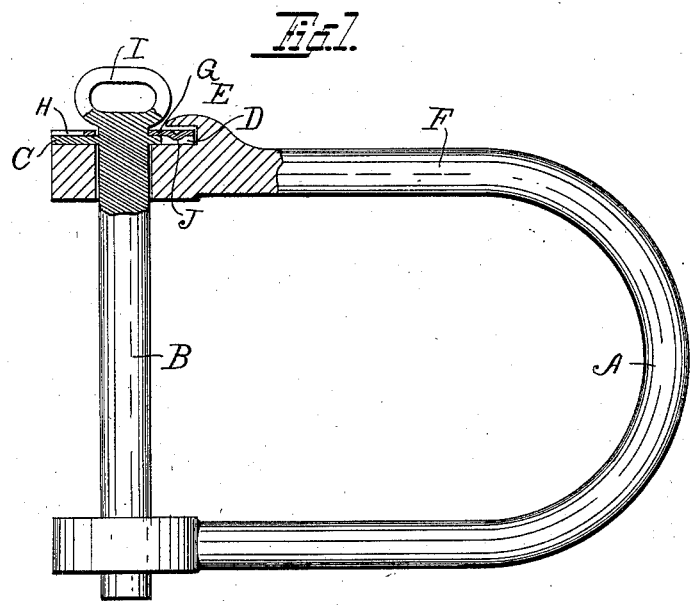
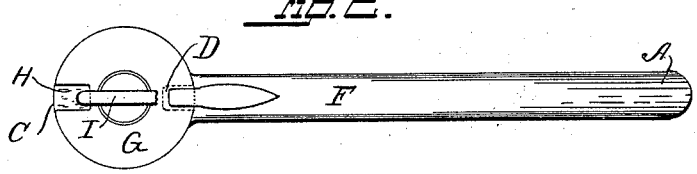
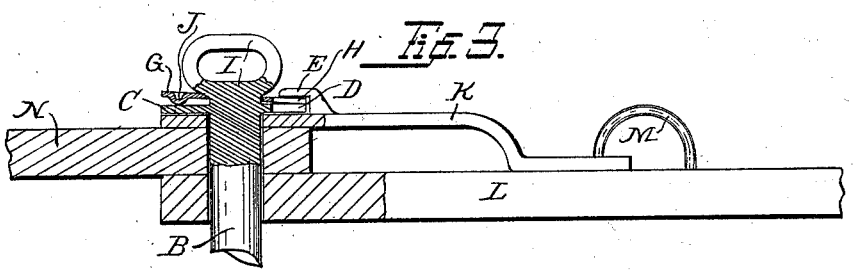
WITNESSES:
INVENTOR.
BY
ATTORNEYS.

No. 748,043.                                    Patented December 29, 1903.

UNITED STATES PATENT OFFICE.

HANS A. BERGOM, OF STOUGHTON, WISCONSIN.

PIN-LOCKING MECHANISM FOR CLEVISES OR SIMILAR PURPOSES.

SPECIFICATION forming part of Letters Patent No. 748,043, dated December 29, 1903.

Application filed April 22, 1903. Serial No. 153,724. (No model.)

*To all whom it may concern:*

Be it known that I, HANS A. BERGOM, a citizen of the United States, residing at Stoughton, county of Dane, and State of Wisconsin, have invented new and useful Improvements in Pin-Locking Mechanism for Clevises or Similar Purposes, of which the following is a specification.

The object of my invention is to provide a simple and efficient device for preventing clevis-pins and the pins for coupling wagon-reaches together and for holding vehicle-whiffletrees in place and preventing them from becoming accidentally disengaged from the eyes of clevises or other supporting-bearings with which such pins are used.

My invention is further explained by reference to the accompanying drawings, in which—

Figure 1 represents a vertical section of the pin-retaining mechanism as used in connection with a clevis. Fig. 2 represents a top view of the device shown in Fig. 1, and Fig. 3 represents a vertical section of the device as used in connection with the reaches of wagons.

Like parts are identified by the same reference-letters throughout the several views.

A represents a clevis.

B represents a clevis-pin. The pin B is provided near its upper end with an annular flange C, which is preferably formed integrally with the pin, but may, if desired, be formed separately and secured thereto, as shown in Fig. 1. The flange C is provided upon one side with the recess D, which is adapted when in the position shown in Fig. 1 to register with the pin-retaining bracket E. The pin-retaining bracket E when used in connection with a clevis is formed integral with the upper arm F of the clevis and is adapted to project over the pin-retaining flange C, whereby it is obvious that when placing the pin in place in the clevis it becomes necessary to hold the same in such a position that the recess D will register with the bracket E, when the flange C is permitted to pass such bracket as the pin drops to its seat. Thus it is obvious that when the pin B has been turned a partial revolution it will become impossible for the same to become accidentally disengaged from the clevis and that in order to remove the pin from the clevis it becomes necessary to turn the pin so that said recess D will again register with said bracket.

While the device thus far described may for most purposes be relied upon to retain the pin in place, I preferably provide the pin with an additional locking mechanism consisting in the annular disk G, which disk is provided with a vertical slot H and is retained in place between the annular flange C and the bolt-head I. Thus it is obvious that when the disk G is in place on the bolt it becomes necessary when inserting the bolt in the clevis to first turn the disk G so that the recess H will register with the recess D of the flange C, when the bolt B is readily inserted in the clevis, as indicated in Fig. 3. When the disk G is turned a partial revolution, so that the recess H will be thrown out of line with the recess D, it becomes impossible to remove the bolt B without turning the disk G so as to again cause said recesses D and H to register with each other and the bracket E. To prevent the liability of the disk G being accidentally turned, so that said recesses D and H will register with each other, I preferably provide said disk G with a downward-projecting lug J, which is adapted to engage in the recess D of the flange C and prevents said disk H from turning. When, however, it is desirous to remove the bolt B, said bolt and disk are turned so that the projection J will be brought to the opposite side of the bolt from the bracket E, when said disk may be tilted slightly and said projection J disengaged from the recess D. When this is done, the disk is readily turned on the bolt until said recesses are caused to register with each other, when they are turned, together with the bolt, until they both register with the retaining-bracket E, when said bolt may be readily withdrawn.

When my bolt-retaining device is used in connection with wagon-poles or vehicle poles or reaches, as indicated in Fig. 3, the bracket E is formed in connection with the brace-strap or keeper K, when said brace-strap or keeper performs the same function, in connection with said pin and bracket, as the upper arm F of the clevis, the pin B and all the other parts of the pin-retaining mechanism being formed substantially the same as shown in Fig. 1.

Referring to Fig. 3, L represents the ordinary vehicle-reach, to which the keeper K is secured by the staple M. N represents the hounds or the part of the wagon with which the reach L is coupled by the bolt B and keeper K in the ordinary manner.

In view of the fact that my bolt-retaining mechanism is equally adapted to be used with clevises, as shown in Figs. 1 and 2, and with the keepers of vehicle-reaches, as shown in Fig. 3, such parts are referred to herein and in the claims as "bolt-supporting bearings," and it will be understood that the words "bolt-supporting bearings" as used in the claims refer either to the arm F of the clevis or the keeper K.

Having thus described my invention, what I claim as new, and desire to secure by Letters Patent, is—

1. The device herein described for retaining a bolt in its supporting-bearings consisting in the combination with such bolt, of a head and separate radial flange, and with said bolt-supporting bearing of a bolt-retaining bracket, said radial flange being provided with a recess, adapted when inserting said bolt, to register with said bolt-retaining bracket, and when said recess is moved out of registry with said bracket, to prevent said bolt from being accidentally disengaged from its supporting-bearings.

2. The device herein described for retaining bolts in their supporting-bearings, consisting in the combination with such bolts of a rigidly-affixed radial flange and a loosely-fitting radial disk; and with said bolt-supporting bearing of a bolt-retaining bracket, said radial flange and disk being both provided with recesses adapted to register with each other and said bracket, when inserting or withdrawing the bolt from its bearings, said recesses being adapted to be turned out of registry with said bracket when locking said bolt in place.

3. The device herein described for retaining bolts in their supporting-bearings, consisting in the combination with such bolt of a rigidly-affixed radial flange and a loosely-fitting radial disk; and with said bolt-supporting bearing of a bolt-retaining bracket, said radial flange and disk being both provided with recesses adapted to register with each other and said bracket, when inserting or withdrawing the bolt from its bearings, said recesses being adapted to be turned out of registry with said bracket when locking said bolt in place, and said loosely-fitting disk being provided with a downward-projecting lug adapted to engage in the recesses of said radial flange, and prevent said recesses from being accidentally brought into registry with each other, substantially as set forth.

4. The combination with the arm F of the clevis A, of a bolt-retaining bracket E and with the bolt B of a bolt-head I, radial flange C and loosely-fitting disk G interposed between said head and flange, said flange and disk being each provided with recesses adapted to be made to register with said bolt-retaining bracket, said radial disk being provided with a downward-projecting lug adapted to register with the recess formed in said radial flange, all substantially as, and for the purpose specified.

In testimony whereof I affix my signature in the presence of two witnesses.

HANS A. BERGOM.

Witnesses:
ERLING K. LOVERUD,
ZOE L. CURRIER.